United States Patent
Ewert

(10) Patent No.: US 6,725,100 B1
(45) Date of Patent: Apr. 20, 2004

(54) AUTOMATIC LOAD ADJUSTMENT

(75) Inventor: Ulrich Ewert, Bichl (DE)

(73) Assignee: Linde Aktiengesellschaft, Hoellriegelskreuth (DE)

( * ) Notice: Subject to any disclaimer, the term of this patent is extended or adjusted under 35 U.S.C. 154(b) by 363 days.

(21) Appl. No.: 09/584,734

(22) Filed: Jun. 1, 2000

(30) Foreign Application Priority Data

Jun. 1, 1999 (DE) .......................................... 199 25 259

(51) Int. Cl.$^7$ ............................................... G05B 13/02
(52) U.S. Cl. ........................... 700/37; 700/33; 700/34; 700/41; 700/42; 700/50; 700/55; 706/900
(58) Field of Search .............................. 700/41, 42, 50, 700/55, 33, 34, 37; 706/900

(56) References Cited

U.S. PATENT DOCUMENTS

| 5,404,289 A | 4/1995 | Hang et al. | 364/148 |
| 5,488,560 A | 1/1996 | Wood et al. | 364/148 |
| 5,748,467 A | 5/1998 | Qin et al. | 364/148 |
| 5,805,447 A | * 9/1998 | Teng et al. | 700/28 |

FOREIGN PATENT DOCUMENTS

| DE | 195 27 412 | 1/1997 |
| EP | 0 701 186 | 3/1996 |
| EP | 0 786 708 | 7/1997 |
| EP | 0 829 784 | 3/1998 |

* cited by examiner

*Primary Examiner*—Ramesh Patel
*Assistant Examiner*—Thomas Pham
(74) *Attorney, Agent, or Firm*—Millen, White, Zelano & Branigan, P.C.

(57) ABSTRACT

The subject of the invention is a process for adjusting a processing unit, whereby at least one set value is varied from a starting value to a final value. In this case, the target value of a correcting value is set based on the starting value and the final value of the adjustment value, and the value of the correcting value is run up from its starting value to its target value using a parameter-dependent transfer function. A control variable is measured, the value of the control variable is compared to a comparison value, and in the case of deviations of the value of the control variable from the comparison value, at least one parameter of the transfer function is corrected.

14 Claims, 1 Drawing Sheet

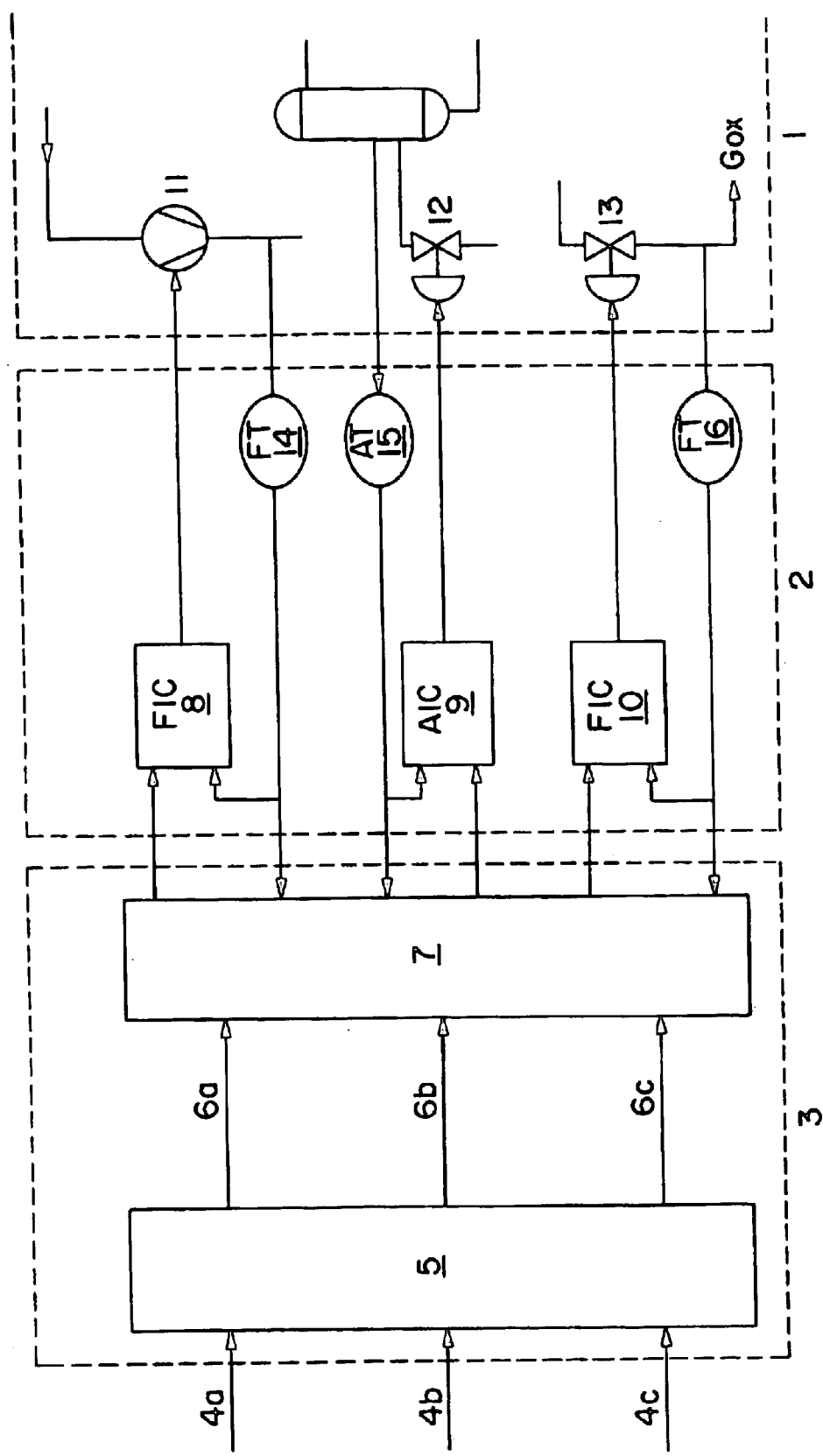

AUTOMATIC LOAD ADJUSTMENT

FIELD OF THE INVENTION

The invention relates to a process for adjusting a processing unit, for example, an air separation unit, whereby at least one set value is varied from a starting value to a final value, the target value of a correcting value is determined based on the starting value and final value of the adjustment value, and the value of the correcting value is run up from a starting value to the target value using a parameter-dependent transfer function.

BACKGROUND OF THE INVENTION

The control and adjustment of processing units is carried out automatically to an increasing extent. Thus, for automatic load adjustment of low temperature units, especially air separation units, automation programs are used that calculate the target values of the corresponding correcting values in the case of a planned increase or reduction of one or more adjustment values, for example the amount of product of oxygen or nitrogen in gaseous form and that relate the regulators that are linked to these correcting values to the target values via a slope function. To compensate for the complex dynamic behavior of these units, the correcting values are adjusted using time-delayed transfer functions, e.g., $P-T_1$ or $PD-T_1$ systems.

The parameters of these transfer functions still cannot be determined precisely by theoretical calculations and must therefore be determined experimentally by extensive tests during the operation of the unit. In this case, it is problematical that different parameters are also frequently necessary for different load adjustments. The search for satisfactory parameter adjustments therefore turns out to be very time-intensive. An inadequate accuracy of the parameters and thus the transfer functions results, however, in an undesirable loss of the product purities during the implementation of the load adjustment.

One object of this invention is therefore to develop a process of the type mentioned above, in which the time-consuming series of tests for determining the parameters of the transfer functions are avoided as much as possible.

Upon further study of the specification and appended claims, other objects and advantages of the invention will become apparent.

SUMMARY OF THE INVENTION

The objects are achieved according to the invention in that a control variable is measured, the value of the control variable is compared to a comparison value, and at least one parameter of the transfer function is corrected in the case of deviations of the value of the control variable from the comparison value.

In the new process according to this invention, selected processing values are measured and used as control variables to determine whether when a set value is altered, the corresponding correcting values are run up to their new target value at a rate that is too high or too low. In the case of deviations of the value of a control variable from a corresponding comparison value, the parameters of the corresponding transfer function or else several corresponding transfer functions are newly calculated and corrected during the alteration of the correcting values. In the adjustment process according to the invention, still during the adjustment process, i.e., before the corresponding adjustment and correcting values have reached their target values, the time behavior of the correcting value guide is affected.

Preferably, in the case of deviations of the value of the control variable from the comparison value to the target value, the correcting value is not altered. Thus, only the time behavior of a setpoint guide, i.e., the rate at which the value of a correcting value approaches its target value, is adjusted, but not the stationary final value, which is attained after the setpoint guide has been completed.

The detection of the control variables and their comparison to the comparison value can be carried out intermittently or continuously. An ongoing measurement of the control variables and optionally an ongoing correction of the parameters of the transfer function has proven advantageous, since boundary conditions that are imposed in this way, for example when there is a change in the load on an air separation unit, can better maintain the product purities.

In the case of a deviation of the value of the control variables from the comparison value, it is often suitable and adequate to correct the time constants of the corresponding transfer functions.

The comparison value, to which the control variable is compared, is advantageously fixed. It is also possible, however, to provide the comparison value with correction factors that depend on the previous course of the alteration of the value of the correcting value.

It is achieved by the process according to the invention that the parameter adjustments of the transfer functions no longer have to be determined exactly but rather only approximately by the series of tests. Extensive studies have shown that by calculating the experimental expense that is linked to the parameter determination and the accuracy of the correcting value guide that results therefrom, a requirement of the value of the parameter for the transfer function up to a magnitude is advantageous. The parameters are preferably specified up to a factor of 5, especially preferably up to a factor of 3. It is adequate, for example, to set a time constant at a value of between 100 and 300 seconds.

If the magnitude of the parameter values is known, simple mathematical functions are advantageously used to form an area of the measured control variables in a parameter range. In principle, this imaging function has to be selected so that an alteration of the value of the control variables has a correcting effect on the course of the correcting value guide. For this purpose, a straight equation is selected, i.e., it is postulated that there is a linear dependence of the parameters of the transfer function on the value by which the control variable deviates from the comparison value.

It is also advantageous to produce the feedback of the control variables in the parameters of the transfer function by adjusting the fuzzy logic. Since with fuzzy logic, it is typically not necessary to maintain a specific value, the transfer function can be formulated with relatively poor definition. This is reflected in a small amount of time spent for setting the parameters and for formulating the transfer function.

It has been shown that with respect to the boundary conditions that are to be maintained in the case of an alteration of a set value, it is advantageous, when the setpoint of the adjustment value is raised, to select a transfer function or a transfer function with different parameters than when the setpoint of the adjustment value is reduced.

The process according to the invention can be used preferably in all types of forward controls and perturbation variable compensations in the control and adjustment of any processing units.

The process is preferably used in the adjustment of a low-temperature air separation unit. In this connection, the amounts of one or more of the products oxygen, nitrogen or argon either in gaseous or liquid aggregate state especially preferably form the adjustment value.

As control variables, the values of liquid level, pressure, temperature flow or analysis have proven advantageous.

The process according to the invention has also especially proven worthwhile during automatic starting of processing units. To start a processing unit, it is only necessary to preset the desired setpoints in the stationary operating state, e.g., product amounts and product purities; the starting of the unit is then carried out automatically.

The new final value of an adjustment value is advantageously set based on specific events or specific control values. Thus, for example, in the control of an air separation unit, it is advantageous to observe the pressure in an oxygen product tank, the amount of product oxygen transferred to the consumer and/or its time functions. These values give indications regarding the instantaneous and expected product oxygen requirements and can therefore be used to introduce automatically either a load increase or a load reduction of the air separation unit.

The load adjustment of the processing unit preferably is not performed in a quasi-stationary manner but rather different gradients, downtimes, delays and/or suspensions are provided for individual adjustment values.

In the case of excess deviation of the value of the measured control variables from the comparison value, it has also proven worthwhile for the correcting value to avoid once a perturbation variable that compensates the deviation.

The process according to the invention provides a considerable time savings when the automation of a processing unit, especially a low-temperature air separation unit, is started up. The start-up costs of the unit can thus be significantly reduced. In addition, an increase in quality of the automation system is achieved by the new process. The required boundary conditions in the alteration of one of the adjustment values of the processing processes can be reliably maintained. Thus, for example, in a load variation of an air separation unit, maintaining the product purities is ensured.

BRIEF DESCRIPTION OF THE DRAWING

The FIGURE diagrammatically shows the adjustment and control of an air separation unit, as a preferred embodiment of the invention.

DETAILED DESCRIPTION OF THE DRAWING

An air separation unit 1 is adjusted by an automatic load alteration system 2, which acts on various components of air separating unit 1 via an adjustment system 3. Via inputs 4a to c, the new setpoints for specific adjustment values can be imposed on system 2. This can be, for example, the amount of volume of charging air, the amount of gaseous product oxygen and the amount of liquid product nitrogen.

In a first step 5, automatic load alteration system 2 examines whether input new setpoints 4a to 4c are compatible with one another, i.e., whether it is a stable condition in which all new setpoints are met. If new setpoints 4a to c correspond to the physical boundary conditions of the air separation process, the latter are fed to a process-control computer 7 as target values 6a to c. Otherwise, corrected setpoints are offered to the operator who operates load alteration system 2, and he is required to input new setpoints 4a to c.

Process-control computer 7 acts on various correcting elements 11, 12, 13 via regulators 8, 9, 10 to alter the set values gradually from their starting value to the desired final value. These alterations proceed in each case along time- and parameter-dependent transfer functions. Using flowmeters 14 and 16 as well as analyzer 15, ongoing control variables during the load alteration, namely the amount of volume of charging air, the amount of gaseous product oxygen and the oxygen content in the center of the pressure column are measured, and their values are fed to process-control computer 7. Process-control computer 7 compares the measured control variables with corresponding comparison values and optionally influences the parameters of the transfer functions, with which correcting values 11, 12, 13 are run up to their target values.

Thus, for example, the oxygen content in the center of the pressure column is determined with analyzer 15 and compared to a specified comparison value in process-control computer 7. If the pressure column analysis shows an excessive oxygen content, the amount of volume of charging air is slowly increased in the case of a load increase or quickly decreased in the case of a load reduction. Regulator 9 acts in a corresponding way in valve 12. The final value that the amount of volume of charging air attains after the change in load in the stationary state has ended is not affected in this case.

Also, the preceding specific embodiment is to be construed as merely illustrative, and not limitative of the remainder of the disclosure in any way whatsoever.

The entire disclosure of corresponding German application DE-19925259.1, filed Jun. 1, 1999 is hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for adjusting a change in load in an air separation unit and/or for adjusting operations during the startup of an air separation unit, said process comprising varying at least one set value of an adjustment value from a starting value to a final value, setting the target value of a correcting value based on said starting value and said final value of said adjustment value, running up the value of said correcting value from its starting value to said target value using a parameter-dependent transfer function, measuring a control variable, comparing the value of said control variable to a comparison value, and, if the value of the control variable deviates from the comparison value, correcting at least one parameter of the transfer function, wherein the adjustment values are selected from the amount of gaseous oxygen, liquid oxygen, gaseous nitrogen, liquid nitrogen, gaseous argon, liquid argon, or combinations thereof, and, wherein at least one of the values liquid level, pressure, temperature, flow or analysis is measured as a control variable, and wherein, before said adjustment value is varied from its starting set value to its final set value, the new final set value is examined to determine if it results in an unstable condition and, if it does result in an unstable condition, a new corrected final set value is determined.

2. A process according to claim 1, wherein in the case of deviations of the value of the control variable from the comparison value of the target value, the correcting value is not altered.

3. A process according to claim 1, wherein the value of the control variable is compared continuously to the comparison value.

4. A process according to claim 1, wherein a time constant of the transfer function is corrected.

5. A process according to claim 1, wherein the value of the control variable is compared to a specified comparison value.

6. A process according to claim 1, wherein the parameter of the transfer function is calculated from the deviation of the value of the control variable from the comparison value using a mathematical imaging function.

7. A process according to claim 1, wherein the parameters of the transfer function and the deviation of the value of the control variable from the comparison value are linked via adjustment of fuzzy logic.

8. A process according to claim 1, wherein only the magnitude of the parameter of the transfer function is specified.

9. A process according to claim 1, wherein when the setpoint of the adjustment value is raised, a different transfer function is selected than when the setpoint is reduced.

10. A process according to claim 1, wherein a forward adjustment or perturbation variable compensation is used.

11. A process according to claim 1, wherein said process is used to adjust a change in load in an air separation unit.

12. A process according to claim 1, wherein said process is used for adjustment during starting of an air separation unit.

13. A process according to claim 1, wherein the value of the control variable is intermittently compared to the comparison value.

14. A process according to claim 1, wherein the comparison value, to which the control variable is compared, is not fixed, but is provided with correction factors which depend on previous alteration of the correcting value.

* * * * *